Figure 1:
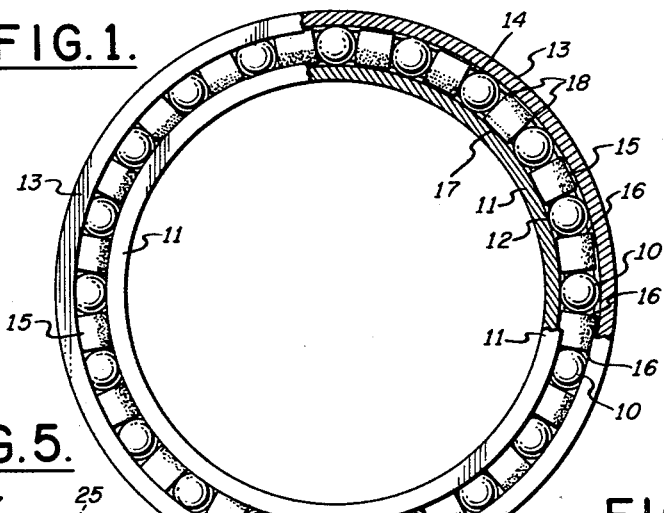

Oct. 16, 1962 C. M. HAM 3,058,789
BALL BEARINGS
Filed Oct. 4, 1960

INVENTOR
CHARLES M. HAM
BY
ATTORNEY

United States Patent Office 3,058,789
Patented Oct. 16, 1962

3,058,789
BALL BEARINGS
Charles M. Ham, Huntington, N.Y., assignor to Sperry Rand Corporation, Great Neck, N.Y., a corporation of Delaware
Filed Oct. 4, 1960, Ser. No. 60,421
3 Claims. (Cl. 308—199)

This invention relates to an improvement in ball bearings of the type in which adjacent spherical balls of relatively rigid material are yieldingly maintained in separated condition in a raceway formed by complementary ball races by a cubic cylindrical spacer of synthetic plastic composition that fits lengthwise in the raceway of the bearing. Adjacent balls of the bearing are engaged by the respective flat, convex or concave end walls of the improved plastic cylindrical spacer to maintain the desired separation of the balls in the raceway of the bearing.

Preferably, the ball spacers of the improved bearing are formed of a synthetic plastic composition having the characteristics of Teflon or nylon. Plastics of this character provide spacers with desirable bearing qualities in that they are of low specific gravity as compared to the balls and known types of metallic separators. They possess relatively high lubricity characteristics so that the dynamic resistance of the spacers to movement in the raceway is relatively low. In relation to the bearing, the improved plastic spacing cylinder possesses spring characteristics providing relatively high resistance to both compression along the axis of the cylinder as well as axial flexure. While the compression and flexure qualities of the plastic cylinders are as described, such cylinders also provide sufficient pliancy or elasticity to yield to the changing loads on the balls of the bearing and accordingly function to maintain the balls separated in a manner similar in action to that of a highly resistant compression metal spring.

One of the objects of the invention is to eliminate the need of metallic spring separators in ball bearings. Particularly under the influence of cantilever loading, the improved plastic separators maintain ball separation under severe conditions of axial load, far beyond that supplied by metallic springs. Thus, friction is held desirably low and yet a larger, more eccentric load may be carried for a longer bearing life.

A feature of the invention resides in the provision of a ball bearing assembly wherein each spacer is formed of a synthetic plastic composition of cubic cylindrical configuration sized to fit lengthwise in the raceway with its end walls engaging adjacent ball bearings at two spaced contact points. The composition spacer has relatively high lubricity characteristics and spring characteristics providing relatively high resistance to compression along its longitudinal axis and relatively high resistance to flexure along its longitudinal axis.

A further feature of the invention resides in the provision of a ball spacer of the character described that is axially perforated.

Figure 5:
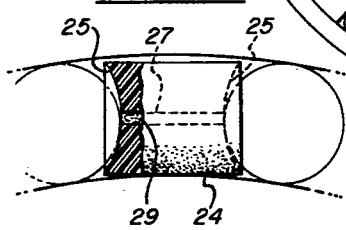
Figure 3:
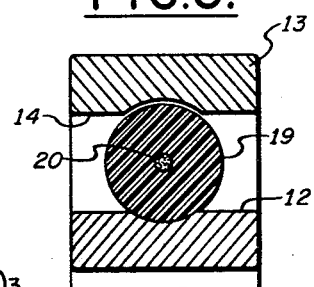
Figure 2:
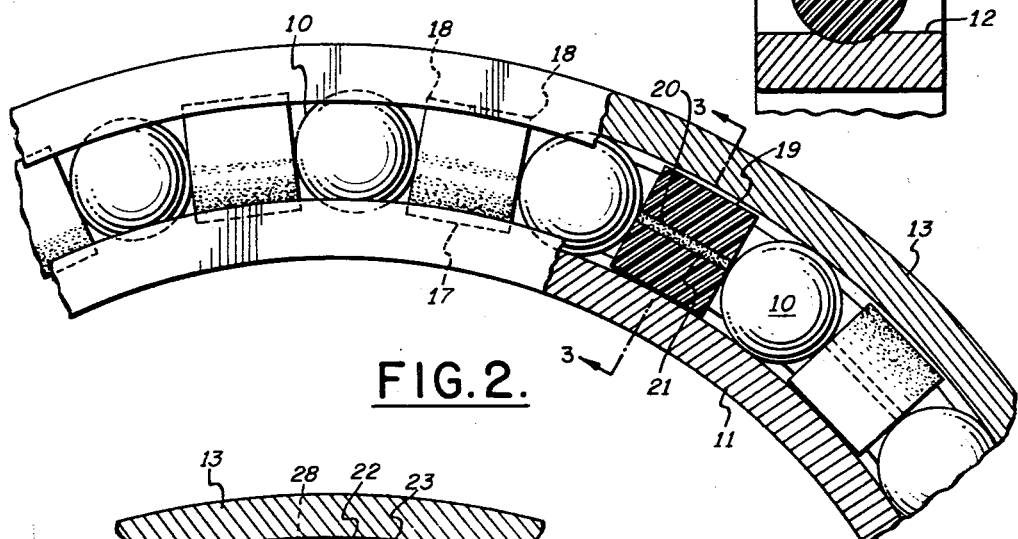
Figure 4:
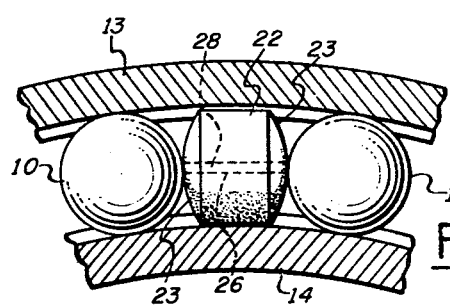

Other objects and features of the present invention will be apparent from the following description when read in relation to the accompanying drawings, wherein FIG. 1 is a view in front elevation and partial section showing a bearing assembly in which the end walls of the improved plastic cylindrical ball spacers are flat, FIG. 2 is an enlarged partial view similar to FIG. 1, in which the improved spacer shown in FIG. 1 includes an axial perforation therein, FIG. 3 is a sectional view taken on line 3—3, in FIG. 2, FIG. 4 is a detail view of an individual spacer similar to FIG. 2 in which the end walls of the spacer are convex, and FIG. 5 is a view similar to FIG. 4 in which the end walls of the improved spacer are concave.

As shown in the drawings, the radial type bearing assembly represented in FIG. 1 includes balls 10, a bearing member 11 having an inner concave race 12 and a bearing member 13 having an outer concave race 14. The raceway provided for the balls of the bearing is formed of the complementary races 12 and 14 in the adjacent faces of the respective bearing members 11 and 13. The axis of the bearing is at the center of the concentric circular races 12 and 14, and either bearing member is movable with respect to the other about the provided axis. As shown in FIG. 1, the raceway provided between the races 12 and 14 includes a series of alternate balls and spacers that are respectively twenty one and twenty in number. The spacers included in the assembly are provided to keep the balls relatively uniformly separated in the raceway as relative motion between the race members occurs about the axis.

In accordance with the present invention the spacers included in the assembly are each formed of a synthetic plastic composition of substantially solid cubic cylindrical configuration as indicated at 15 in FIG. 1. The cylindrical spacer 15 is of a diameter less than that of the balls 10 and is of a length such as to fit lengthwise in the circular raceway with its flat end walls 16 engaging adjacent ball bearings 10 at two spaced contact points without lengthwise flexure. As the improved spacer slides lengthwise along the raceway, its side wall surface contacts the inner race 12 frictionally at a single point of engagement midway between the ends of the cylinder as indicated at 17. Frictional engagement with the outer race 14 occurs at the edges of the side wall of the cylinder at its respective ends as indicated at the contact points 18. The length of the spacer is dependent upon the curvature of the raceway as well as on the resistance characteristics of the composition to both axial compression and axial flexure for a particular cylinder diameter. The length is further dependent on the number of balls utilized in the bearing and the spacing desired therebetween. The length of the spacer is accordingly selected so that for a composition having the spring characteristics of Teflon or nylon, it will not bend or flex axially in the raceway under normal condition of loading for which the bearing is designed. Teflon spacers have been found particularly satisfactory in cylindrical form as possessing the necessary compression and flexure qualities. This composition is further suitable in maintaining the friction losses of the bearing at a low value because of its relatively high lubricity characteristics. The improved spacers also maintain the substantially uniform separation of the balls because of their relatively high resistance to compression. Synthetic plastic spacers of a composition other than Teflon or nylon having the necessary characteristics in the provided configuration are considered to come within the scope of the present invention.

In inserting the plastic spacers between the adjacent balls of the bearing in assembling the parts, each spacer is squeezed through the radial opening between the adjacent sides of the races 12 and 14, the same being compressed diametrically and slightly flexed axially by force in this operation. The spacers return to their original cylindrical shape within the raceway in which the same fit as previously described and shown in FIG. 1. This operation obviates the need of mounting slots in the sides of the races as previously required in completing the assembly of bearing where metallic spring spacers were employed. The diameter of the individual spacers is accordingly greater than the radial opening between the adjacent sides of the concave ball races.

In the modification of the invention shown in FIGS.

2 and 3, the spacers 19 provided include an axial perforation 20 therein. The perforation 20 does not unbalance the cylinder within the raceway and provides a relatively small opening therein that enables the spacers to be more readily inserted into the raceway in the assembly operation. Where internal lubrication is required for a low friction bearing, the perforation provides an opening in the spacer that is filled with a suitable substantially solid lubricant as indicated at 21 such as grease dispersed molybdenum disulphide.

Variations of the spacer from the flat end surface configuration shown in FIGS. 1 and 2, are respectively shown in FIGS. 4 and 5. In FIG. 4, the end walls of the cylindrical spacer 22 are convex in shape as indicated at 23. In FIG. 5, the end walls of the cylindrical spacer 24 are concave in shape as indicated at 25. The indicated respective spacers 22 and 24 include respective axial perforations 26 and 27 containing suitable lubricant of the character heretofore noted as indicated at 28 and 29. The contact of the balls 10 with the curved surface ends of the type of spacers shown in FIGS. 4 and 5, is the same as that provided in the flat end type shown in FIGS. 1 and 2. The type of spacer shown in FIG. 4 requires less area in the raceway than that of the type shown in FIG. 1. Similarly, with respect to spacer 15, the spacer 24 requires a greater area on the raceway of the bearing.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A ball bearing with inner and outer concave races providing a circular raceway with a radial opening between the sides of the concave races, and a series of alternate spherical balls of a relatively rigid material and spacers of a substantially solid synthetic plastic composition in the bearing raceway, wherein each of said composition spacers is a cubic cylinder having high lubricity characteristics and spring characteristics providing high resistance to lengthwise compression and flexure whose diameter is greater than the radial opening between the sides of the concave races and less than that of the spherical balls and whose diameter and length are such that the same fits lengthwise in the circular raceway without lengthwise flexure with its ends contacting adjacent spherical balls at spaced points.

2. A bearing of the character claimed in claim 1 in which the diameter and length of the cubic cylindrical spacers and the curvatures of the concave races are such that each composition spacer engages the inner race at a single point contact midway between its ends and engages the outer race at two spaced contact points at its respective ends.

3. A bearing of the character claimed in claim 1 in which the substantially solid spacers are cubic cylinders of Teflon composition having a perforation at the lengthwise axis thereof.

References Cited in the file of this patent

UNITED STATES PATENTS

| | | |
|---|---|---|
| 2,008,378 | Witte | July 16, 1935 |
| 2,827,345 | Zeilman | Mar. 18, 1958 |
| 2,861,849 | Case | Nov. 25, 1958 |
| 2,897,021 | Zeilman | July 28, 1959 |

FOREIGN PATENTS

| | | |
|---|---|---|
| 770,182 | France | June 25, 1934 |
| 146,647 | Australia | May 29, 1952 |